US008142279B2

(12) United States Patent
Benrus

(10) Patent No.: US 8,142,279 B2
(45) Date of Patent: Mar. 27, 2012

(54) METHOD OF PARI-MUTUEL WAGERING IN REAL TIME

(75) Inventor: Mark Benrus, North Aurora, IL (US)

(73) Assignee: JJAMMD, LLC, North Aurora, IL (US)

( * ) Notice: Subject to any disclaimer, the term of this patent is extended or adjusted under 35 U.S.C. 154(b) by 1734 days.

(21) Appl. No.: 11/207,657

(22) Filed: Aug. 19, 2005

(65) Prior Publication Data

US 2007/0060308 A1 Mar. 15, 2007

(51) Int. Cl.
*G06F 17/00* (2006.01)

(52) U.S. Cl. .......................................................... 463/25

(58) Field of Classification Search .................... 463/13, 463/16–28; 273/292

See application file for complete search history.

(56) References Cited

U.S. PATENT DOCUMENTS 5,476,259 A * 12/1995 Weingardt ...................... 463/28
5,984,779 A * 11/1999 Bridgeman et al. ............ 463/16
6,634,946 B1 * 10/2003 Bridgeman et al. ............ 463/28
7,172,508 B2 * 2/2007 Simon et al. .................... 463/42
2004/0009812 A1 * 1/2004 Scott et al. ...................... 463/28
2004/0229671 A1 * 11/2004 Stronach et al. .................. 463/6
2004/0235542 A1 * 11/2004 Stronach et al. .................. 463/6
2005/0227757 A1 * 10/2005 Simon ............................. 463/25

* cited by examiner

*Primary Examiner* — Ronald Laneau
(74) *Attorney, Agent, or Firm* — Skokos Law Group LLC; Soula Skokos

(57) ABSTRACT

The present invention is directed to a method of wagering on live horse and dog races or jai alai games, or similar games or races or similar games or races that allow for pari-mutuel wagering on multiple players or runners in real time. The method of wagering includes the steps of an input wager placed by a user, where at least part of the wagering base is at least one real time horse/dog race or jai alai game or similar game or race, specifically a horse/dog race or jai alai game or similar game or race that in real time has yet to start and possesses a start time that falls within a predetermined period of time from the time in which the input wager was placed by the user; the at least one real time horse/dog race or jai alai game is randomly selected from any real time horse/dog races or jai alai games, or similar games or races that fall within the predetermined period of time; a type of wager and then runner (s) for said randomly selected real time horse/dog race or jai alai game are randomly selected which are then correlated to the input wager, the outcome of the randomly selected real time horse/dog races or jai alai games, or similar games or races is identified and a return for the user's wager is identified.

20 Claims, 4 Drawing Sheets

METHOD OF PARI-MUTUEL WAGERING IN REAL TIME

BACKGROUND OF THE INVENTION

1. Field of the Invention

This invention relates to the gaming industry and, more particularly, to a method of wagering using real time horse/dog races, jai alai games, or similar games or races that allow for pari-mutuel wagering on multiple players or runners or the like. The invention is also directed to a wagering system of the type through which the inventive wagering method can be practiced.

2. Background of the Invention

The success of the slot machine has had a devastating effect on the live horse and dog racing industry. Slot machines appeal to a much larger audience of bettors because they appeal to all levels of gambling expertise. Beginning bettors at slot machines not only do not need to know the mechanics of a particular game in order to be successful at wagering, but also do not need to study probabilities in order to make a calculated wager. In order to be successful at gambling with slot machines, individuals need only operate a switch through a button or lever, with the results being entirely random and beyond the operator's control. Success at a track, on the other hand, generally requires extensive study of both race forms and race results as well as an intimate understanding of handicapping. The random selection in slot machine gambling obviates the need for understanding handicapping or probabilities. Therefore, in slot machine gambling there is no concept of making a "mistake." Due to the complete randomness of the results in slot machines, the bettor simply makes a wager and hopes for the best. In addition to the complexity in horse and dog race gambling, there is also the public perception that many track races are "fixed." Still further, many race tracks have undesirable, antiquated facilities, causing people interested in live races to instead frequent off-track facilities.

In order to reverse the downward trend at race tracks, it would be desirable to enable gamblers to place wagers on live horse and dog races and jai alai games, or similar games or races with the ease and convenience of slot machine gambling. While the areas of pari-mutuel wagering and slot machines have been issued several patents, the combination of pari mutual wagering in real time and slot machines does not have any precedent. For example, U.S. Pat. No. 5,888,136 applies to a method and system of wagering that relies in part on the outcome of a previously run race or game. It is therefore not applicable to a method of wagering on live horse and dog races and jai alai games, or similar games or races in real time.

SUMMARY OF THE INVENTION

The present invention is directed to a method of wagering on live horse and dog races or jai alai games or similar games or races that allow for pari-mutuel wagering on multiple players or runners, including the steps of an input wager placed by a user, where at least part of the wagering base is at least one real time horse/dog race or jai alai game or similar games or races, specifically a horse/dog race or jai alai game that in real time has yet to start and possesses a start time that falls within a predetermined period of time from the time in which the input wager was placed by the user; the at least one real time horse/dog race or jai alai game is randomly selected from any real time horse/dog races or jai alai games, or similar games or races that fall within the predetermined period of time by assigning a random number to each real time horse/dog race or jai alai game using a random number generator; a type of wager for said randomly selected real time horse/dog race or jai alai game is then randomly selected using a random number generator; using the randomly selected type of wager, the number of runners are then determined in accordance with the number of runners required for said type of wager; a runner or runners for said randomly selected real time horse/dog race or jai alai game are randomly selected using the random number generator; the randomly selected real time horse/dog races or jai alai games, or similar games or races, the randomly selected type of wager and the randomly selected runner or runners (the "randomly selected wagering base") are correlated to the input wager and become the user's "pending wager;" once said race or game begins, the user's pending wager becomes the user's "in progress wager;" the outcome of the randomly selected real time horse/dog races or jai alai games, or similar games or races is identified; the outcome of the randomly selected real time horse/dog races or jai alai games, or similar games or races is correlated to the user's in progress wager, and a return for the in progress wager is identified.

Through the above method, pari-mutuel wagering can be carried out in a "slot machine" format. Once a pending wager is correlated to the randomly selected real time horse/dog race or jai alai game, the pending wager may be placed into the pari-mutuel pool that is established for that real time horse/dog race or jai alai game, thereby providing for real time pari-mutuel wagering. Likewise, the return for an in progress wager may be paid from the same pool of returns as the pari-mutuel pool that is established for that real time horse/dog race or jai alai game or similar game or race.

The method may further include the steps of providing multiple locations from which input wagers are received and pending wagers are correlated to randomly selected real time horse/dog race or jai alai games, or similar games or races. With this arrangement, it is possible to network the wagering to increase the handle.

The method may further include the steps of providing multiple input wagers to be processed simultaneously from one single location. With this arrangement, a user may make multiple input wagers simultaneously and have multiple pending wagers correlated to various randomly selected real time horse/dog race or jai alai games, or similar games or races to increase the user's chances of winning.

In one embodiment, the input wager may be processed within a terminal whereby a discrete object may be inserted into the terminal by the user. This object may be in the form of a card, bill, coin, ticket, voucher and the like. Alternatively, the input wager may be placed through the use of a prepaid account or credit card whereby the amount of the input wager will be deducted from the balance of such account.

In another embodiment, the input wagering terminal has a repositionable element that is accessible to a user. The discrete object is processed by repositioning the repositionable element after the discrete object is inserted. The repositionable element may be a lever that is pivotable. Alternatively, the input wagering terminal may have push buttons whereby the discrete object may be processed by the depression of the push button by the operator after the discrete object is inserted. The repositioning of the repositionable element or depression of the push button will operate an internal switch that thereby causes the search and random selection of the real time horse/dog races or jai alai games, or similar games or races.

To give the location around the input wagering terminal a more realistic feel, an audio and/or visual signal can be produced to one of a) simulate an equestrian event, b) simulate a live race environment, c) assist placement of input wagers, d) identify the beginning of a wagering period, e) identify the end of a wagering period, f) simulate a live game environment, g) audibly or visually broadcast at least part of the at least one real time horse/dog race or jai alai game and h) simulate standard slot machine sounds and visual signals such as flashing lights.

The method may further include the steps of printing a cash voucher which identifies the results of a winning input wager and has a cash value equivalent to the final return on said winning input wager. The method may further include the steps of printing a ticket indicating each of the user's pending or in progress wagers including the randomly selected real time horse/dog races or jai alai games, or similar games or races, the randomly selected type of wager and the randomly selected runner or runners. Said ticket may be printed for real time horse/dog races or jai alai games, or similar games or races that have yet to begin or that are already in progress. Such a ticket may allow the user to leave the input wagering terminal once the user's input wager is processed and becomes the user's pending or in progress wager.

DETAILED DESCRIPTION OF THE DRAWINGS

Figure 1:
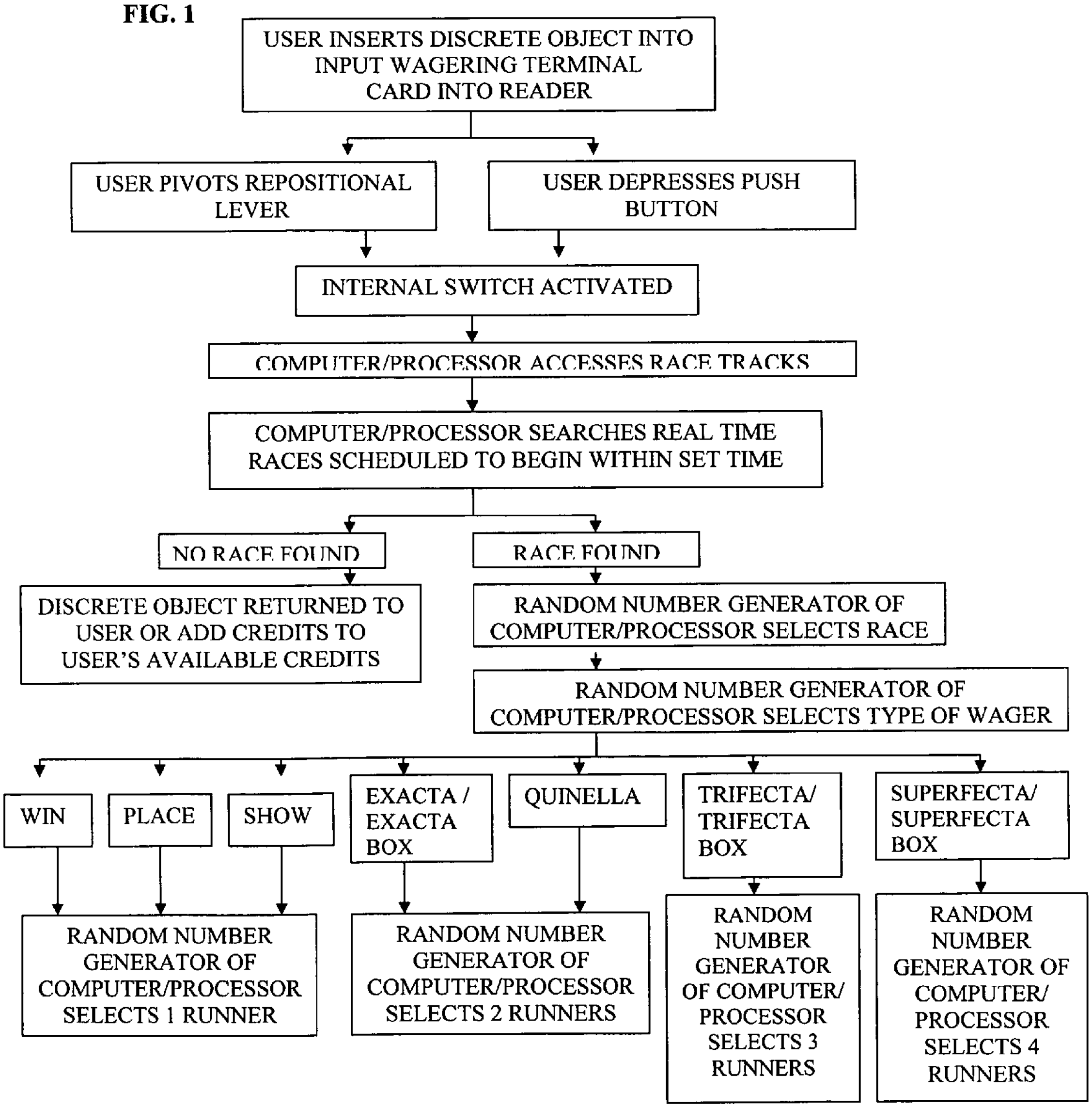
FIG. 1 is a flow diagram illustrating a method of pari-mutuel wagering in real time according to the present invention.
Figure 2:
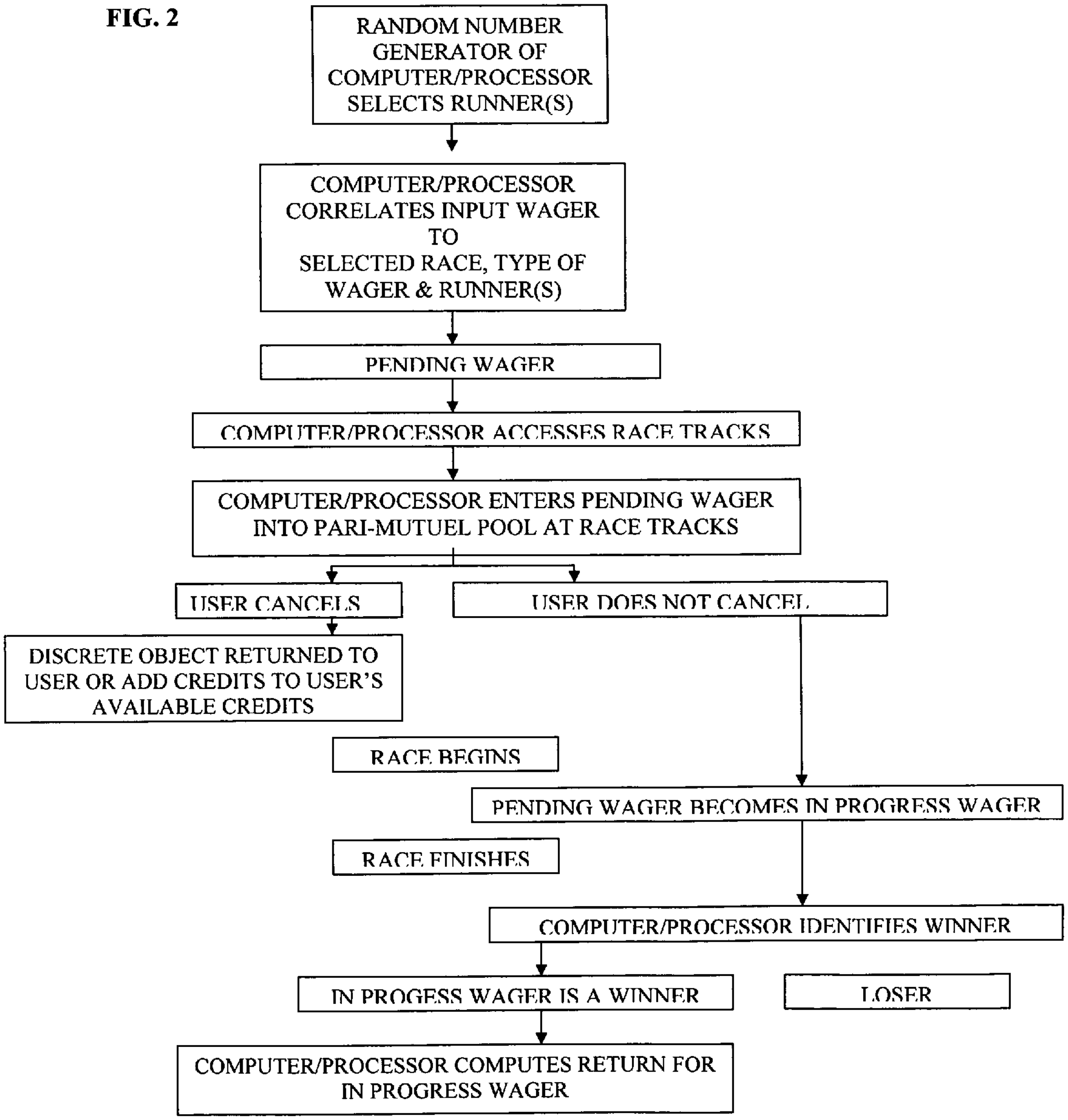
FIG. 2 is a flow diagram illustrating a method of pari-mutuel wagering in real time according to the present invention that flows from the flow diagram in FIG. 1.
Figure 3:
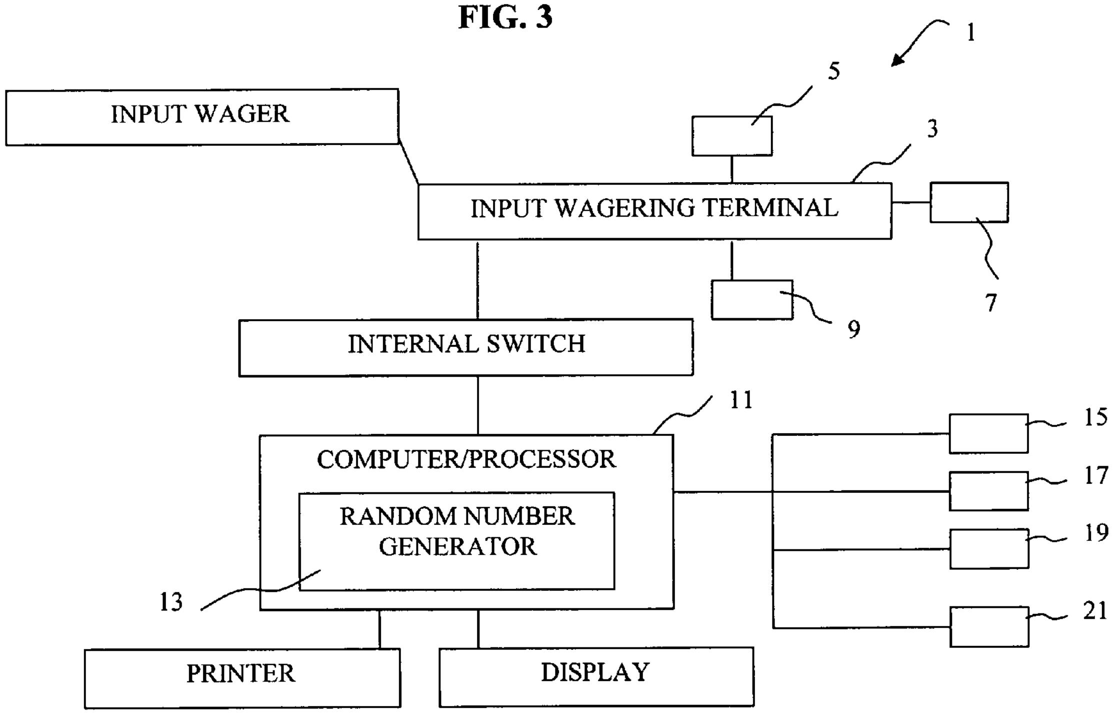
FIG. 3 is an illustration of a system for pari-mutuel wagering in real time according to the present invention.

A system of pari-mutuel wagering in real time, according to the present invention, is shown at 1 in FIG. 3. The system consists of at least one input wagering terminal 3, through which a bettor makes a wager. A multitude of terminals, 5, 7, 9 can be linked at the same location, intrastate, interstate and/or internationally.

The invention contemplates that pari-mutuel betting can be carried out in a "slot machine" format.

According to the invention, the system 1 utilizes a computer/processor 11 with a random number generator 13, which has a wagering base made up at least in part by at least one real time live race or a jai alai game or similar game or race. The race may be a horse or dog race or jai alai game or similar game or race that has yet to be run or similar game or race that allows for pari-mutuel wagering on multiple players or runners or the like where the race or game has yet to begin.

To make a bet, the user places a discrete object, not shown, which may be in the form of a card, bill, coin, ticket, voucher and the like, into an opening, not shown, in the input wagering terminal 3. Alternatively, the user may use a prepaid account or credit card, not shown, whereby the amount of the input wager will be deducted from the balance of such account. The credit card or prepaid account card may be inserted into a card reader 45. The value of the discrete object or deduction from the prepaid account will be converted into a corresponding value of available credits from which the user can use at the input wagering terminal to place input wagers. Alternatively, the user may use a cash voucher or winning ticket, not shown, and insert such cash voucher or winning ticket into a voucher reader 57 which would be converted to available credits from which the user can place input wagers at the input wagering terminal. The computer/processor 11 then searches the real time live races or a jai alai games, or similar games or races that are scheduled to begin within a predetermined period of time from the time the user places a discrete object in the input wagering terminal. Advantageously, the computer/processor 11 may be connected via the Internet or via a network to the various race tracks, 15, 17, 19, 21, to determine which races and jai alai games, or similar games or races are about to begin within that predetermined period of time. The random number generator 13 is programmed to assign a random number to each real time live race or a jai alai game that is scheduled to begin within that predetermined period of time. The computer/processor 11 then randomly selects at least one real time live race or game. The computer/processor 11 then randomly selects the type of wager for said real time live race or game by assigning a random number to the type of wagers available, which may include but are not limited to Win, Place, Show, Exacta, Quinella, Trifecta, Superfecta, Exacta Box, Trifecta Box and Superfecta Box.

The computer/processor 11 then determines the number of runners required for said randomly selected type of wager. A Win, Place, or Show type of wager requires a selection of a single runner because the computer/processor 11 is randomly selecting whether a selected runner will be the winner of such race, place in the top two runners of such race, or make a showing in the top three runners of such race, respectively. If a Win, Place or Show type of wager is randomly selected by the computer/processor 11, a single runner will be randomly selected by the computer processor 11. An Exacta, Quinella or Exacta Box type of wager requires a selection of two runners because the computer/processor is selecting the top two finishers of said race. If the type of wager randomly selected by the computer processor 11 is an Exacta, Quinella, or Exacta Box, two runners will be randomly selected by the computer/processor 11. A Trifecta or Trifecta Box type of wager requires a selection of three runners because the computer/processor is selecting the top three finishers of said race. If the type of wager randomly selected by the computer processor 11 is a Trifecta or Trifecta Box, three runners will be randomly selected by the computer/processor 11. A Superfecta or Superfecta Box type of wager requires a selection of four runners because the computer/processor is selecting the top four finishers of said race. If the type of wager randomly selected by the computer processor 11 is a Superfecta or Superfecta Box, four runners will be randomly selected by the computer/processor 11. Therefore, the type of wager randomly selected by the computer/processor 11 will also determine the number of runners required for such a type of wager. The computer/processor 11 then randomly selects the runner (s) for said randomly selected real time live race or game and randomly selected type of wager.

The computer/processor 11 then correlates randomly selected real time live race or game, randomly selected type of wager and the randomly selected runner(s) to the user's input wager and becomes the user's pending wager. The computer/processor 11 thereafter enters the pending wager into the pari-mutuel pool that is established for said randomly selected real time horse/dog race or jai alai game or similar game or race. The pari-mutuel pools are established at the various race tracks, 15, 17, 19, and 21 from which the real time live races were randomly selected. Advantageously, the computer/processor 11 may be connected via the Internet or via a network to the various race tracks, 15, 17, 19, and 21 to enter the pending wagers into such established pari-mutuel pools. Once the randomly selected race of the user's pending wager begins in real time at the race track, the user's pending wager becomes an "in progress wager." Advantageously, the computer/processor 11 will deem a user's pending wager an in progress wager when the randomly selected race of the user's pending wager is within a set period of time from the start time of such race. Once the real time live race is finished, the computer/processor 11 determines whether the randomly selected runner is a "winner" according to the outcome of such real time live race.

In this embodiment of the invention, the computer/processor 11 randomly selects the type of wager for the user. The type of input wager may be any type of wager a user would be able to choose at a live race track, including but not limited to: Win, Place, Show, Exacta, Quinella, Trifecta, Superfecta, Exacta Box, Trifecta Box and Superfecta Box. By allowing the computer/processor 11 to randomly select the type of wager, the confusion with determining which type of wager has the best returns for the user is eliminated. When the real time live race is finished, the computer/processor 11 determines whether the randomly selected runner is a "winner" and if the selected runner is a "winner", determines what the payoff is for the in progress wager. Since the in progress wager is entered into the pari-mutuel pool that is established for that real time horse/dog race or jai alai game or similar game or race, the payoff for each in progress wager must be determined in proportion to the amount of the input wager. In this embodiment, the payoff for a "winning" wager would be equivalent to the payoff at the pari-mutuel pool but scaled back according to the value of the input wager.

In one embodiment of the invention, the user would be allowed to override the predetermined period of time to allow for a greater predetermined period of time in which real time live races or games can be selected. In the event there is no real time live race or game from which to select within that predetermined period of time from the time the user places an input wager, the input wagering terminal 3 would return the discrete object to the user or add the amount of the input wager to the available credits to the user. Advantageously, the input wagering terminal 3 would produce the same audio and visual signals as if the user was a "winner" to add to the excitement of the wagering experience.

In one embodiment of the invention, the user may be able to select a number that the computer/processor 11 would use when randomly selecting the runner(s) such that the number selected by the user must be appear at least in one of the runner numbers selected. If the user selected the number 6, at least one of the runners randomly selected by the computer/processor would have the running number 6. Such a selection by the user would allow the user to play his/her "favorite" number.

In one embodiment of the invention, the user may be able to choose whether the runner that is deemed to be a favorite in the real time live race at the time the computer/processor 11 makes the random selection would be included or excluded from the runner(s) that would be randomly selected by the computer/processor 11. Such a selection by the user would be made prior to the random selection of the real time live race or game by the computer/processor 11.

In one embodiment of the invention, the input wagering terminal 3 may be any personal computer or computing device that is linked to a computer/processor 11 with a random number generator 13 via the Internet. The user thereby can use his/her own personal computer to link to a host computer or server via a network of some type such as the Internet and is allowed to place input wagers from the comfort of his/her home. The host computer or server may be linked to the various race tracks, 15, 17, 19, and 21 via the Internet or via a network to determine which races and jai alai games, or similar games or races are about to begin with a predetermined period of time. The user may use a credit card or prepaid account card to place an input wager, whereby the amount of the input wager will be deducted from the balance of such account. The host computer may process the input wager and be programmed to take the identical steps as described above to create the user's pending and in progress wagers. The user may also be able to use any hand-held wireless devices such as personal digital assistants (PDA) and cellular phones and any other hand held wireless devices that allow Internet access, to link to a host computer or server via a network of some type such as the Internet to place input wagers. Those of skill in the art will understand that the present invention can be deployed on most any device now available or hereafter developed that allows users to access the Internet.

Figure 4:
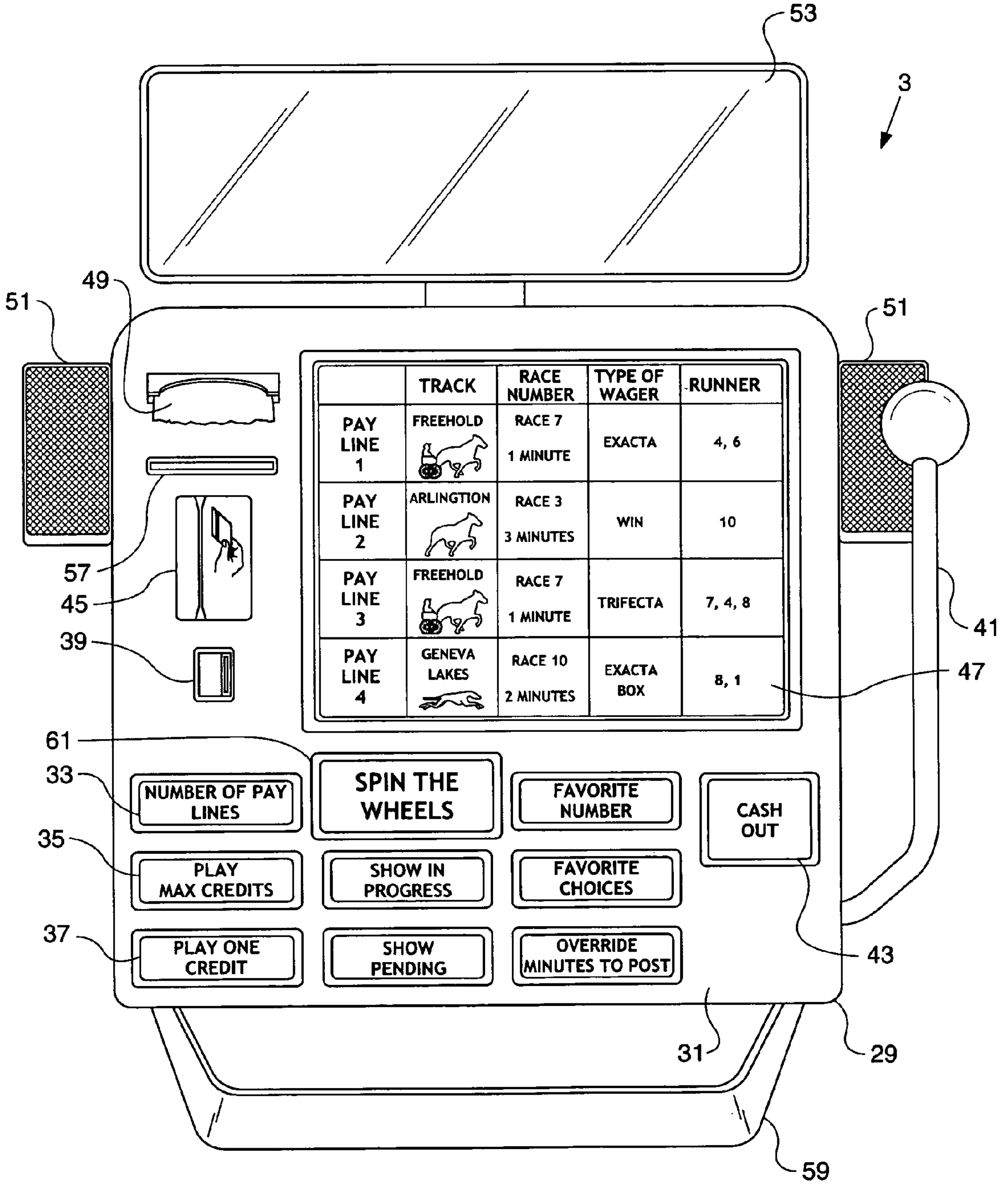
FIG. 4 is a front view of an input wagering terminal that is part of the wagering system for pari-mutuel wagering in real time in FIG. 3.

In one embodiment of the invention, the input wagering terminal 3, as shown in FIG. 4, includes a housing 29 which simulates the appearance of a conventional slot machine. The housing has a front display wall 31 with push or slide button operators. The push or slide button operators 33, 35, 37, may allow the user to select how many credits or the amount of money the user would like to place for each input wager.

The housing has a slot/opening for a coin 39 that is processed to accept the user's input wager. After inputting the coin and the computer/processor 11 has converted said coin into a corresponding value of available credits, a repositionable lever 41, in this case a pivotable operating arm as used on slot machines, is pivoted to operate an internal switch, not shown, which thereby causes the random number generator 13 of the computer/processor 11, not shown, to search the real time live races or a jai alai games, or similar games or races that are scheduled to begin within a predetermined period of time. Alternatively, the repositional lever may be replaced with a push button allowing the operator to depress the button 61 to cause the random number generator of the computer/processor 11 to search the real time live races or a jai alai games, or similar games or races that are scheduled to begin within a predetermined period of time. As an alternative to a coin actuator, a reader or scanner 45 could be used to identify information on a card to initiate the acceptance of the user's input wager. Such a reader or scanner 45 may be used to identify information on a credit card or card issued by the facility that may function similarly to a debit card issued by a financial institution to which a user can add money. Alternatively, a voucher reader 57 may be used to identify information on a cash voucher that has a cash value which can be converted to available credits from which a user can place input wagers at the input wagering terminal.

In one embodiment, the housing 29 may have a display 47 that identifies to the user the pending wagers, including but not limited to the race track, race, type of wager and runner(s) that have been randomly selected by the computer/processor. Advantageously, the user may have the option to cancel one of the pending wagers prior to the start of the live race or game. In the event a user cancels such a pending wager prior to the start of the live race or game, the input wagering terminal 3 would return the discrete object to the user or add the amount of the input wager to the available credits to the user.

In one embodiment, a user may be able to place multiple input wagers simultaneously at a single input wagering terminal. For each input wager, the computer/processor 11 randomly selects a real time live race or game, a type of wager and runner(s) and correlates such selections to the input wager to become individual pending wagers. Each pending wager then may be shown on the display 47 of the input wagering terminal 3 as a separate "pay line" as in conventional slot machine gambling. The user may also be able to select the number of input wagers by depressing a button 33 on the front display wall 31 of the input wagering terminal.

In one embodiment, a user may be able to place a single input wager on a series of real time live races or games. The computer/processor 11 may be programmed to randomly select a real live time race or game, type of wager and runner(s) for at least two real live time races or games to be correlated to a single input wager. The outcomes of all of the real live races or games correlated to said single input wager must be identified in order to determine if the input wager is a "winner." In this embodiment, a user is able to wager on at least two real time live races or games with a single input wager similar to how a user would place a wager on a "Daily Double," "Pick 3," "Pick 4," or "Pick 9" at a racing track facility. Advantageously, the user would be able to select "Daily Double," "Pick 3," "Pick 4," or "Pick 9" after placing a single input wager. The computer/processor 11 would then take the same steps as discussed in detail above to randomly select a race, type of wager and runner(s) for each such real time live race or game. Advantageously, the user may be able to leave the input wagering terminal 3 once the user's input wager is processed and becomes the user's pending or in progress wager through the use of a ticket indicating each of the user's pending or in progress wagers including the randomly selected real time horse/dog races or jai alai games, or similar games or races, the randomly selected type of wager and the randomly selected runner or runners.

In one embodiment, the housing may also have a printer 49 that can print a cash voucher which identifies the results of a winning input wager and has a cash value equivalent to the final return on said winning input wager. The printer 49 may also print a ticket, not shown, indicating each of the user's pending or in progress wagers including the randomly selected real time horse/dog races or jai alai games, or similar games or races, the randomly selected type of wager and the randomly selected runner or runners. Said ticket may be printed for real time horse/dog races or jai alai games, or similar games or races that have yet to begin or that are already in progress. Such a ticket may allow the user to leave the input wagering terminal once the user's input wager is processed and becomes the user's pending or in progress wager. Once the outcome of the user's in progress wagers is determined, if the user's in progress wager is a "winner," the user may use said printed ticket to redeem the user's return or payoff on that in progress wager from the facility. The printer 49 may also print a voucher or ticket indicating the user's previous wagers.

To add another dimension to the system, an audio signal generator 51 and/or a visual signal generator 53 can be used to produce effects that simulate an equestrian event, simulate a standard slot machine environment, simulate a live race environment, assist placement of input wagers, identify the beginning of a wagering period, identify the end of a wagering period, simulate a live game environment, or otherwise add to the excitement or authenticity of the system. The randomly selected real time live race may be broadcast in real time audibly and/or visually through the system. Advantageously, the user may able to simply select the race that has been randomly selected by the computer/processor 11 to be broadcast in real time via an Internet connection or direct feed. Alternatively, the display 47 may be connected to the Internet or direct feed such that the real time live race of the user's pending or in progress wager may be broadcast from said display 47. Advantageously, the user may be able to depress a button located on the front display wall 31 that would be connected to a switch, not shown, that would allow the user to select between a live broadcast of the real time live races or games of the user's pending or in progress wagers.

In one embodiment of the invention, the user may "cash out" all of the user's available credits by depressing a button 43 located on the front display wall 31. If the user were to "cash out," the user would have the option to have the input wagering terminal 3: (1) Return the user's available credits in the form of a discrete object such as a coin in a coin receptacle 59; (2) Print a cash voucher which has a cash value equal to the value of the user's available credits from the printer 49; (3) Print a voucher or ticket indicating the user's pending or in progress wagers from the printer 49; (4) Cancel all of the user's pending wagers; and (5) any allowable combination of (1)-(4).

In one embodiment of the invention, a multitude of terminals would be linked at the same location, intrastate, interstate and/or internationally. By networking the terminals, additional wagers may be made between such terminals such as "Bonus Spins" whereby users would be eligible to an additional payoff based on the input wagers at the linked terminals. The terminals may be networked within the same location, where additional wagers may be made between such terminals as in conventional slot machine gambling where users have the chance to gamble on bonus spins that are termed, "Wheel of Fortune." Such additional wagers are not entered into the pari-mutuel pools established at the various race tracks 15, 17, 19 and 21 but rather are pools that are set up at each location or networked locations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wagering system comprising:

at least one input wagering terminal through which a user places an input wager;

a computer or processor with a random number generator that is linked to said input wagering terminal where said computer or processor is networked to race tracks having real time horse/dog race or jai alai games, or similar games or races and established pari-mutuel betting pools and where when the user places an input wager, said computer or processor is programmed to simultaneously complete the following sequence to form a wagering base that includes at least two wagers for said input wager:

a) randomly make at least two selections of at least one real time horse/dog race or jai alai games, or similar games or races that in real time have yet to start and possesses a start time that falls within a predetermined period of time from the time in which the input wager was placed by the user;

b) randomly select a type of wager for the at least one real time horse/dog race or jai alai game or similar game or races that have been randomly selected;

c) randomly selecting the runners for the at least real time horse/dog race or jai alai game or similar game or race for said input wager;

d) without requiring any input from user, assign said randomly selected real time horse/dog race or jai alai game or similar game or race, type of wager and runners to said input wager to become user's pending wager wherein said pending wager becomes an in progress wager upon the start of said real time horse/dog race or jai alai game or similar game or race;

e) identify outcome of said real time horse/dog race or jai alai game or similar game or race; and f) identify a return for said input wager.

2. The wagering system according to claim 1 wherein said input wagering terminal is a computing device linked to a host computer or server via the Internet to provide a network to race tracks having real time horse or dog race or jai alai games, or similar games or races and established pari-mutuel betting pools to enter said in progress wager into the pari-mutuel pool that is established for said real time horse or dog race or jai alai game and identify the return for said in progress wager determined by said pari-mutuel pool once the outcome of said real time horse or dog race or jai alai game is identified.

3. The wagering system according to claim 1 wherein said input wagering terminal is a handheld device linked to a host computer or server via the Internet to provide a network to race tracks having real time horse or dog race or jai alai games, or similar games or races and established pari-mutuel betting pools to enter said in progress wager into the pari-mutuel pool that is established for said real time horse or dog race or jai alai game and identify the return for said in progress wager determined by said pari-mutuel pool once the outcome of said real time horse or dog race or jai alai game is identified.

4. The wagering system according to claim 1, wherein the sequence includes the step of providing a network to race tracks having real time horse or dog race or jai alai games, or similar games or races and established pari-mutuel betting pools.

5. The wagering system according to claim 1, wherein the sequence includes the step of entering said in progress wager into the pari-mutuel pool that is established for said real time horse or dog race or jai alai game, or similar games or races.

6. The wagering system according to claim 1, wherein the sequence includes the step of identifying the return for said in progress wager determined by the pari-mutuel pool that is established for said real time horse or dog race or jai alai game, or similar games or races.

7. The wagering system according to claim 1, wherein the input wager may be received from any computing device linked to a host computer or server via the Internet.

8. The wagering system according to claim 1, wherein the input wager may be received from any handheld device linked to a host computer or server via the Internet.

9. The wagering system according to claim 1 wherein the sequence can be executed simultaneously so that a user may be able to place multiple input wagers simultaneously at a single input wagering terminal.

10. The wagering system according to claim 1 wherein the sequence can be executed for at least two real time live races or games from a single input wager.

11. The wagering system according to claim 1 including the step of printing a voucher which identifies the results of a winning input wager and has a cash value equivalent to the return on said winning input wager.

12. The wagering system according to claim 1 including the steps of providing an input wagering terminal and processing a discrete object that is inserted into the input wagering terminal to commence the random number generator.

13. The wagering system according to claim 1, wherein the input wagering terminal has a repositionable element that is accessible to a user and the step of processing a discrete object comprises the step of repositioning the repositionable element after the discrete object is inserted into the input wagering terminal.

14. The wagering system according to claim 1 wherein the input wagering terminal includes a push button that is accessible to a user and the step of processing a discrete object comprises the step of depressing the push button after the discrete object is inserted into the input wagering terminal.

15. The wagering system according to claim 14 wherein the sequence includes the step of assigning an amount of credits to the user corresponding to said money value for each input wager.

16. The wagering system according to claim 15 wherein the sequence includes the step of providing a final return amount for each in progress wager in an amount of credits to the user.

17. The wagering system according to claim 16 wherein the sequence includes the step of providing a money value for the amount of credits corresponding to said final return amount.

18. The wagering system according to claim 17 wherein the amount of an input wager may be increased once a pending wager has been created.

19. The wagering system according to claim 1 wherein said input wagering terminal includes a display that identifies the user's pending or in progress wagers, including the race track, race, type of wager and runners that have been randomly selected.

20. The wagering system according to claim 1 wherein the input wagering terminal includes audio and visual signal generators producing at least one of an audio and visual signals to at least one of a) simulate an equestrian event, b) broadcast a live race environment, c) simulate a standard slot machine environment, d) assist placement of input wagers, d) identify the beginning of a wagering period, e) identify the end of a wagering period, and f) simulate a live game environment.

* * * * *